Figure 3:
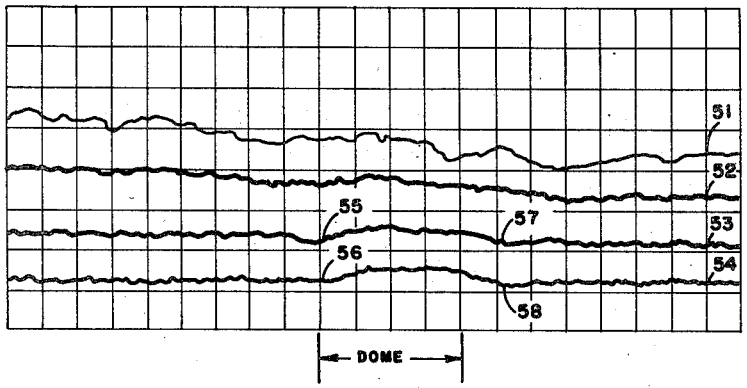

Nov. 21, 1950     R. R. THOMPSON     2,531,088
ELECTRICAL PROSPECTING METHOD
Filed Oct. 16, 1947     2 Sheets-Sheet 1
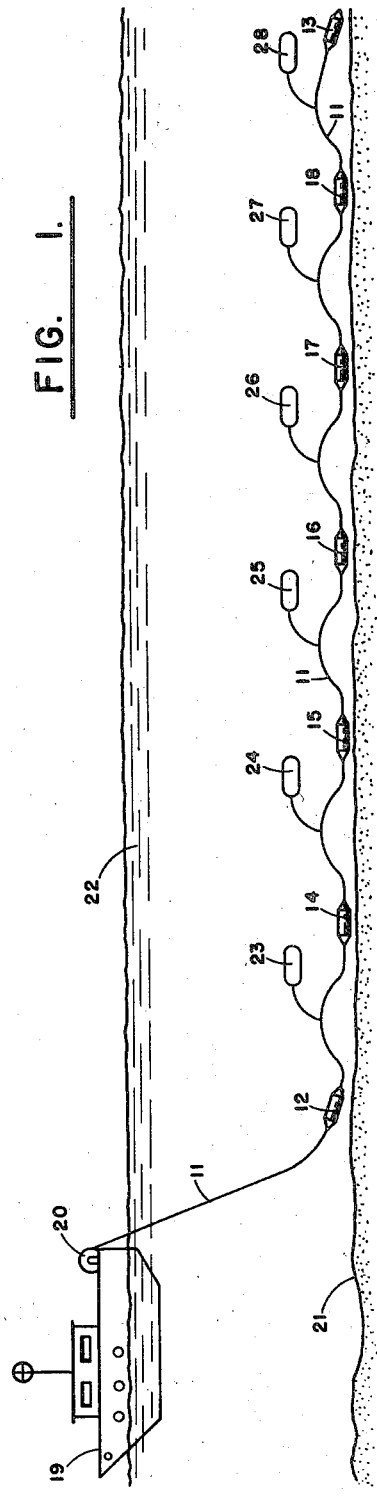
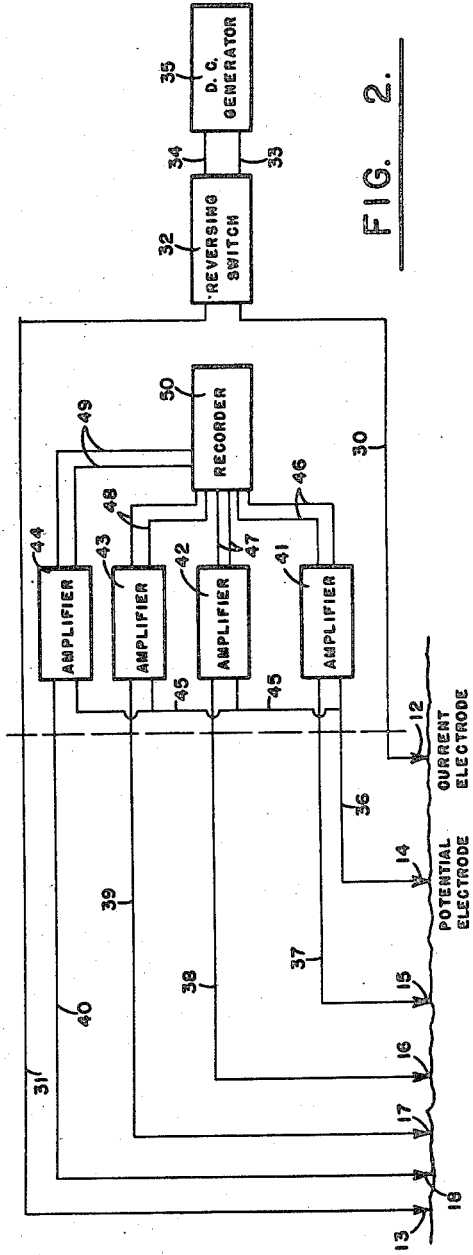
Robert R. Thompson, INVENTOR.
BY Dwight C. Otis
AGENT.

Patented Nov. 21, 1950

2,531,088

UNITED STATES PATENT OFFICE 2,531,088

ELECTRICAL PROSPECTING METHOD

Robert R. Thompson, Houston, Tex., assignor, by mesne assignments, to Standard Oil Development Company, Elizabeth, N. J., a corporation of Delaware Application October 16, 1947, Serial No. 780,252

3 Claims. (Cl. 175—182)

The present invention is directed to a method for conducting continuous electrical prospecting surveys over water covered areas. More particularly, the invention is directed to a method for continually measuring the electrical properties of subsurface strata underlying a body of water in order to ascertain the lithologic and structural characteristics, as well as a real distribution of these strata.

Electrical surveys over non-water covered areas of the earth have been carried on for many years and are well known in the prior art. Briefly, methods for conducting these surveys generally include planting electrodes in the ground, applying an electrical current between two of the electrodes, usually referred to as "current electrodes," and measuring the electrical potential developed between two other electrodes also planted in the ground and commonly referred to as "potential electrodes." In order to obtain information relative to subsurface strata at more than one depth it is usually necessary to observe measurements with more than one spacing or spread between the electrodes. Accordingly, it is customary to make measurements with one spread between the electrodes at a given station, then change the spread, and make a second measurement. The prior art methods are obviously both time consuming and laborious and, furthermore, are not readily adaptable to measurements over large areas covered by deep water, particularly when the water is rough and disturbed by waves and the like.

Surveys of changes in electrical characteristics of subsurface formations have, however, been made over areas covered by water. A survey of this nature has been described by C. & M. Schlumberger and E. G. Leonardon in transactions of the American Institute of Mining Engineers, Geophysical Prospecting, vol. 110 (1934), pages 122–134. In the surveys described by these authors, boats bearing electrodes confined to a single spread near the upper surface of the water were arranged and then maintained motionless in the water by anchors. Continuous recording of changes in electrical characteristics using either one or several electrode spreads simultaneously while moving the boats over the area was not attempted. In effect, the point to point land survey method was used over water in this instance.

I have now discovered a method whereby electrical prospecting surveys may be continuously conducted over areas covered by water, even though the water may be deep and its surface may be disturbed by wave action. Stated briefly, my invention includes towing through the water a multiconductor cable having spaced thereon a pair of current electrodes connecting through insulated conductors in the cable to an electric generator mounted upon the cable towing vessel, and also having spaced thereon a plurality of potential electrodes connected, respectively, through other insulated conductors in the cable, to suitable amplifiers and continuous, potential recording means also mounted upon the cable towing vessel.

One of the major difficulties encountered in any continuous recording, electrical prospecting method involves the fluctuations in what may be termed natural potential. The existence of potential due to telluric or natural earth currents has been known for years and has been the subject of considerable study by geophysicists. Such currents are due primarily to solar activity and are continually changing in both magnitude and direction over the earth's surface. Studies of such currents have been confined almost entirely to land areas. However, since they encompass the entire earth they extend into the oceans as well.

In water-covered areas there are also electrical currents produced by the motion of the water in the earth's magnetic field. Chapman and Bartels in their book entitled "Geomagnetism" (1940), Oxford University Press, on pages 445–448 and 708–709 describe experiments which have been conducted to study this electrodynamic phenomenon. The theory of electromagnetic induction, when applied to sea water moving at a velocity of one knot across the earth's magnetic field, predicts the presence of electrical currents of the order of $10^{-8}$ amperes per square centimeter. An equivalent surface current of $4 \times 10^{-4}$ amperes per square centimeter and a resulting magnetic field having a horizontal component of about 20 gamma exists in the Gulf Stream near Florida. Effects of this kind have also been observed in connection with tidal variations. For example, in the English Channel variations of 20 to 35 millivolts per kilometer were observed. Similarly, the effect of a wave about 10 feet high, assuming a revolving velocity near the surface of about 3 knots, induces a potential of 6 millivolts per 100 meters. In addition, to the potentials resulting from the currents described above, there will be voltages generated in a cable connecting a pair of potential probes if the cable is moved transversely in the earth's magnetic field. A still further source of potentials encountered in any practical measuring system is the electrochemical action taking place at the contact of the electrodes with the electrolyte in which they are placed. Various means of minimizing such potentials by the use of porous cup electrodes, for example, are well known to the art and need not be described here. In the following description the term "natural potential" will be used to include the total potential difference observed between the terminals from the potential probes when no energizing current is flowing through the current electrodes. Thus, the natural potential includes all the effects referred to above and is to be distinguished from the artificially produced potential which results from the flow of current in the current electrode circuit. It is evident that it is the change or fluctuation in the natural potential which interferes with and complicates the continuous measurement of the artificially produced potential. If the natural potential remained perfectly constant, it could be balanced out and ignored but in practice it varies with time at such a rate and by a sufficient amount as to constitute a serious difficulty. In the practice of my invention it has been found that the potentials produced by telluric currents are usually small and may be ignored; the potentials resulting from currents generated by wave motion and by water currents are much less at the bottom than at the surface of the water; and that the motion of the cable and, therefore, the voltages generated by its motion are greatly reduced if the cable is dragged along the bottom of the body of water rather than floated by buoys at the surface of the water. Accordingly, I prefer to drag the cable along the bottom of the body of water but, in order to minimize wear and drag on the cable, I have devised a method of utilizing submerged buoys which lift a portion of the cable off the bottom at suitable intervals along the length of the cable. This feature will be described in more detail subsequently. I further minimize the natural potential effects by increasing the artificially produced energizing current to such an extent above the usually employed value that the residual electro-dynamic fluctuations become negligible with respect to the artificially generated potential. However, the size of the power plant required to supply an energizing current of the necessary magnitude, together with the difficulty encountered when switching large currents at high voltages, imposes a practical limit to this latter method of minimizing these effects.

One of the primary objects of my invention is to conduct over water covered areas surveys in which observations of variations in electrical properties encountered in sub-surface strata are made and recorded continuously.

Another object of my invention is to conduct over water covered areas electrical surveys in which observations of variations in electrical properties encountered in sub-surface strata are made and recorded substantially continuously and simultaneously from a plurality of electrode spacings or spreads.

Still another object of my invention is to overcome electro-dynamic effects encountered in electrical surveys when moving an electro-conductive cable longitudinally through the magnetic field of the earth.

A further object of my invention is to provide means whereby a long cable may be towed under water for a long period of time at a reasonably rapid speed without excessive wear on the cable and with the cable at a desired depth behind the stern of a boat.

An additional object of my invention is to provide apparatus which continually records variations, simultaneously at a plurality of points along a cable, of those electrical characteristics which it is desired to observe and record.

Figure 4:
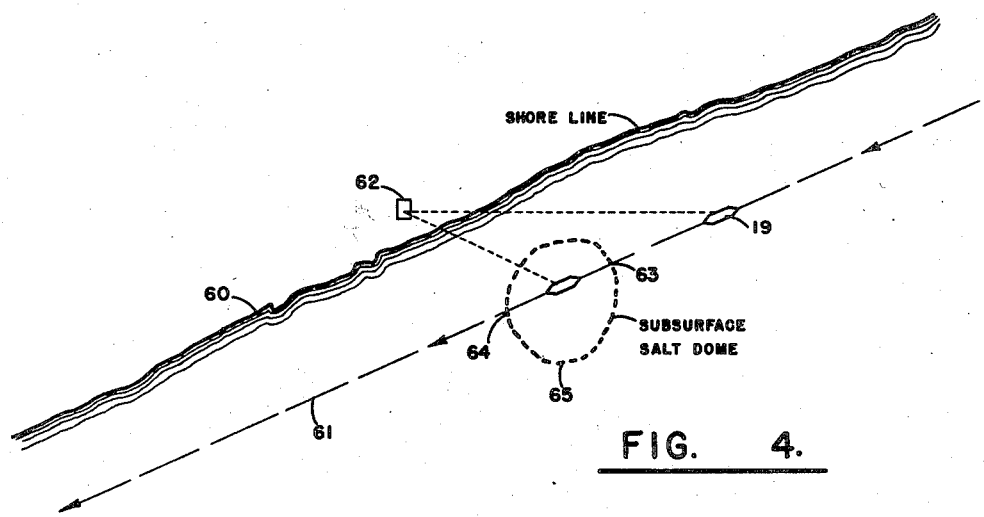

Still other and further objects of my invention will be apparent from the following description taken in conjunction with the accompanying drawing in which Fig. 1 represents a vertical section through a body of water and earth strata below the water, and shows a schematic arrangement of one embodiment of apparatus suitable for practising my invention;

Fig. 2 is a schematic diagram illustrating the electrical connections of one embodiment of apparatus suitable for practising my invention;

Fig. 3 is a graph representing a continuous recording of electrical potentials measured while towing over a water covered area a multi-conductor cable having two current electrodes and five potential electrodes spaced thereon in accordance with a preferred embodiment of my invention, and Fig. 4 is a map representing one method of fixing the position of the course of a cable towing vessel employed in the practise of my invention.

Referring now to the drawing and first to Fig. 1, the numeral 11 designates a multi-conductor cable which includes a sufficient number of insulated conductors so that each of current electrodes 12 and 13, and each of a plurality of spaced potential electrodes, such as 14, 15, 16, 17, and 18, may be individually connected to electric generating or to potential recording means mounted upon a vessel 19. Vessel 19 may be a water-borne or a suitable air-borne vessel which is self-propelled and capable of towing cable 11 through the water. In a preferred embodiment of my invention, vessel 19 is a self-propelled boat provided with a power-driven reel 20 mounted at the stern whereby cable 11 may be reeled aboard the vessel or unreeled behind the vessel and be drawn through the water, as desired.

Although in the practice of my invention it is desirable that electrodes 12, 13, 14, 15, 16, 17, and 18 should be operated in a position as close as possible to the floor 21 of the body of water 22, excessive wear upon the outer insulating jacket of the cable and excessive drag against the pull of boat 19 will result when several thousand feet of cable of suitable construction for the purpose is towed unsupported behind the boat. Accordingly, I prefer to attach a plurality of submerged buoys such as 23, 24, 25, 26, and 27 at selected spaced points along the cable.

In a series of tests wherein a cable somewhat over 6000 feet long was arranged with an electrode 13 at the far end of the cable and an electrode 12 spaced 6000 feet from electrode 13 and a plurality of potential electrodes spaced therebetween, it was found that the pull or drag at the point where the cable was fastened at the stern of the boat 19 amounted to more than a thousand pounds when the entire cable was towed at a rate of approximately 3 knots. In another test in which a series of buoys having a buoyancy of about 55 pounds each were attached at 500 foot intervals along the cable, the drag upon the cable was reduced to approximately 700 pounds. It was found that this drag, when using the buoys, remained substantially constant for towing speeds ranging from 3 to 6 knots whereas without the buoys the drag increased approximately linearly with the velocity. These observations may be explained on the basis that an increase in speed causes an additional lift in the buoys from water flow forces thereon. Accordingly, it is preferable that the buoys should be attached to the cable in such a manner that the nose tends to ride higher than the tail of the buoy. Although in the above example the submerged buoys were spaced at intervals of approximately 500 feet along the cable it will be apparent that a larger number of buoys having individual buoyancy effects smaller than those described may be employed by spacing the buoys at shorter intervals along the cable. It is desirable, however, that the buoys should be so spaced that the electrodes mounted upon the cable should be drawn along the bottom of the body of water as close as possible and preferably less than 3 to 6 feet above the bottom.

As is known in the prior art, when conducting an electrical survey, it is customary to flow an electric current into the earth between two points and to measure an artificially produced potential between two other points. The artificially produced potential is proportional to the current sent through transverse strata into the earth and reverses direction with a reversal in the direction of the flow of the current. Over most areas of the earth, natural electrical potentials also exist. These natural potentials vary from place to place and are not steady but fluctuate with time in an erratic manner from a number of causes. The fluctuation in natural potential observed in tests in water covered areas usually consists of a slow drift, which reverses direction over relatively long periods of time, of the order of several minutes to a half hour, with much more rapid fluctuations super-imposed upon it. Accordingly, it is apparent that it is necessary to overcome the effects of fluctuations of the natural potential so that fluctuations in artificially produced potential can be accurately observed and recorded in their true significance. Overcoming this problem constitutes one of the major features in the successful development of my invention.

The electrical system for recording the artificially produced potential is shown schematically in Fig. 2. In this figure, as in Fig. 1, the numerals 12 and 13 designate current electrodes which may be arranged with electrode 12 submerged in water adjacent the stern of the vessel upon which the apparatus now to be described is mounted, and with electrode 13 affixed at the far end of the cable. In one embodiment of my invention electrodes 12 and 13 are connected through conductors 30 and 31, respectively, within cable 11 to a current-reversing switch 32 which in turn is connected through conductors 33 and 34 to a direct current generator 35. If desired generator 35 may be a very low frequency alternating current generator connected directly to conductors 30 and 31. It will be understood that generator 35 is driven by a suitable prime mover, such as a gasoline or Diesel motor, not shown.

In a preferred embodiment of my invention potential electrodes 14, 15, 16, 17, and 18 may be spaced between current electrodes 12 and 13. Alternatively, these potential electrodes may be spaced outside of current electrodes 12 and 13. In any event, however, these potential electrodes are connected by insulated conductors 36, 37, 38, 39, and 40, respectively, in cable 11 to voltage amplifiers 41, 42, 43, and 44. Referring to Fig. 2 it will be seen that electrode 14 is designated as a "reference potential electrode" and is connected to each of amplifiers 41, 42, 43, and 44 through a common conductor 45 which is connected to conductor 36 and reference electrode 14.

In the practise of my invention either alternating current having a very low frequency, for example, one-third cycle per second or less, or a periodically reversed direct current whose polarity is reversed every one and one-half seconds, is preferably employed although other low frequencies of alternation or reversal may be employed. Accordingly, amplifiers 41, 42, 43, and 44 are of such construction that they will be capable of amplifying either the alternating current or the periodically reversed direct current potentials picked up by the potential electrodes. Suitable electronic voltage amplifiers capable of amplifying these voltages are well known in the prior art and hence a detailed description of such amplifiers is not given herein.

When employing periodically reversed direct current in the practice of my invention, I prefer to employ a smoothing filter ahead of each amplifier to remove the previously mentioned rapid fluctuations in natural earth potentials and to provide a relatively constant signal input into the amplifier following each half switching cycle. Suitable band-pass filters are known in the prior art and, therefore, are not described herein. In the drawing it is assumed that the designation of an amplifier includes such a filter when periodically reversed direct current is to be employed.

As has already been stated, reversing switch 32 need not be employed when a very low frequency alternating current is supplied from generator 35. However, momentarily disconnecting the amplifiers at the time of current reversal is desirable when employing periodically reversed direct current and under these conditions it is desirable that suitable switching means synchronized with this reversing switch should be inserted just ahead of amplifiers 41, 42, 43 and 44 so that the amplifiers may be left disconnected from conductors 36, 37, 38, 39, and 40 during a short interval at the time of the current reversal to prevent switching surges from affecting the measurements made at the output of the amplifiers. When employing direct current which is reversed every one and one-half seconds, it has been found that a delay in reconnecting the amplifiers to the insulated conductors amounting to approximately 0.3 second is satisfactory.

The signal output from each of amplifiers 41, 42, 43, and 44 is suitably rectified either within the amplifier or after passing through pairs of conductors 46, 47, 48, and 49, respectively, into a continuous recorder 50 capable of continually recording small direct current potentials. A suitable recorder is well known in the prior art and is illustrated by the Brown multichannel recording potentiometer manufactured by The Minneapolis-Honeywell Co. Other similar recording potentiometers capable of continually recording small potential differences may, however, be employed.

To illustrate further the practice of my invention, reference will now be made to Fig. 3 of the drawing showing graphs of data obtained while towing a multi-conductor cable through deep salt water over a course passing over a salt dome which was located in the earth strata below the floor of the body of water. Reference will also be made to Fig. 4 illustrating one mode of fixing the course and position of the cable towing boat and of the electrodes.

In obtaining the data of Fig. 3 an arrangement of electrodes upon a cable similar to that shown in Fig. 1 was employed. The distance between electrodes 12 and 13 was substantially 6000 feet while the distance between electrodes 12 and 14 and 14 and 15 were each substantially 2000 feet. Electrode 16 was spaced 1000 feet from electrode 15, electrode 17 was spaced 500 feet from electrode 16 and electrode 18 was spaced 250 feet from electrode 17. Electrodes 12 and 13 were connected to a direct current generator which produced a potential of about 100 volts at 12 amperes. The polarity of electrodes 12 and 13 was reversed every one and one-half seconds by a motor driven reversing switch adapted to break the high current. Electrode 14 was connected in common to all of the potential amplifiers mounted aboard the cable towing vessel.

In the graph of Fig. 3 the axis of ordinates represents electrical potentials in millivolts and the axis of abscissa represents time. Since the magnitude of the potential measured between two specific electrodes increases when one of the potential electrodes is moved nearer to a current electrode, it is apparent that the potential measured between electrodes 14 and 18 will be larger than the potential measured between electrodes 14 and 15. Accordingly, in Fig. 3 the data illustrated by curve 51 represents the potential measured between electrodes 14 and 18. Curve 52 represents the potential measured between electrodes 14 and 17, curve 53 represents the potential measured between electrodes 14 and 16, and curve 54 represents the potential measured between electrodes 14 and 15.

It is well known in the theory of electrical prospecting that for many typical distributions of earth resistivities, the effect on measurements of deep lying strata increases with an increase in the spacing between adjacent current and potential electrodes, the effect of shallow strata becoming correspondingly less. It will, therefore, be apparent that curve 51, representing data obtained in conjunction with potential electrode 18 which was spaced 250 feet from current electrode 13, is significant with respect to relatively shallow strata below the body of water while curve 54 representing potentials measured in conjunction with a potential electrode 15 spaced 2000 feet from current electrode 13 is significant of relatively deep lying strata. Accordingly, the non-uniform variations in curve 51 may be attributed to irregularities near the floor of the body of water. Since curve 52 appears relatively constant, the data suggest that structural anomalies at somewhat deeper strata are not pronounced. On the other hand, at point 55 on curve 53 and at point 56 on curve 54 it will be obvious that the potentials start to make a significant increase in each case. At point 57 on curve 53 and at point 58 on curve 54, the potentials returned approximately to their previous average values. As will be explained in conjunction with Fig. 4, cable 11 was towed over a known subsurface salt dome during the interval of time indicated by points 56 and 58 on curve 54. The rise in potential shown between these intervals is characteristic of the rise in potential produced by subsurface geological structures of high electrical resistivity.

Turning now to Fig. 4, the method of fixing the course and position of the cable-towing boat and of the electrodes upon the cable will be described. In Fig. 4 the line 60 designates the normal shore line along one portion of the Gulf of Mexico. The broken line 61 designates the substantially straight course along which the boat 19 was piloted. A radar transmitter and receiver 62 capable of measuring distances and horizontal angles through 360 degrees was located at a known latitude and longitude upon the shore. At regularly spaced time intervals throughout the travel of boat 19 along course 61 the distance and bearing of boat 19 from radar unit 62 were measured. From the distance, bearing and time information the precise position of the cable towing boat was charted. Since the length of the cable towed behind the boat 19 and since the position of the electrodes on the cable were known, the exact position of any electrodes at any given instant could be calculated. Thus it was determined that the electrodes passed over the point 63 on course 61 at the time interval corresponding to the numeral 56 on curve 54 of Fig. 3 and similarly that the electrodes passed over the point 64 on course 61 at the time indicated by numeral 58 on curve 54. Thus two points partially defining the limits of the salt dome were charted upon a map of the particular area.

By making several runs over the area, either parallel to the course 61 or over any other courses crossing course 61 between points 63 and 64, additional points could be established defining the area of the salt dome indicated by the numeral 65.

Although in the above discussion a shore-based radar unit is described for fixing the position of the boat 19 at any instant, it will be apparent that other means of fixing the position of the boat may be employed. Thus the boat might be equipped with a mobile radar unit adapted to measure distances and angles with respect to one or more marker stations located at known latitude and longitude either on shore or over the body of water. Likewise, other methods providing sufficiently accurate information as to course and position of the cable-towing vessel might be employed.

Having fully described my invention, what I wish to claim as new and useful is:

1. An apparatus for conducting continuous electrical prospecting surveys over an area beneath a body of water including a self-propelled vessel, a multi-conductor cable attached to said vessel and submerged in the water for towing behind the vessel, a pair of current electrodes and a plurality of potential electrodes positioned in spaced relation upon said cable and connected to respective conductors therein, and a plurality of submerged buoys attached at spaced positions along said cable intermediate between said electrodes, said buoys being of such shape and arrangement as to lift a substantial portion of said cable off the bottom of the body of water when said vessel and cable are in motion.

2. An apparatus for conducting continuous electrical prospecting surveys over an area beneath a body of water including a self-propelled vessel upon the surface of the water, a multi-conductor cable attached to said vessel and submerged in the water for towing behind the vessel, a pair of spaced current electrodes and a plurality of spaced potential electrodes positioned upon said cable and connected to respective conductors therein, means aboard said vessel and connected through conductors in the cable to said current electrodes for continually supplying an electric current thereto, means aboard said vessel and connected through conductors in the cable to said potential electrodes for continually measuring potentials therebetween, and a plurality of submerged buoys attached at spaced positions along said cable intermediate between said electrodes, said buoys being of such shape and arrangement as to impart a lifting force to a substantial portion of said cable when the vessel and cable are in motion.

3. In the art of electrical resistivity prospecting over an area beneath a body of water, the method for continuously exploring a plurality of sub-surface strata simultaneously which includes the steps of providing an insulated multiconductor cable having arranged in spaced relation thereon a pair of current electrodes and a plurality of potential electrodes differently spaced thereon with respect to said current electrodes whereby resistivities at different depths may be determined, attaching a plurality of submersible buoys to said cable at selected points between said electrodes, continuously towing said cable through the water substantially along a selected course over the said area whereby a substantial portion of said cable is lifted off the bottom by movement of said buoys and said electrodes are moved adjacent the bottom of the body of water, continually applying a high density electric current between said current electrodes, and continually recording electric potentials developed between selected pairs of said potential electrodes.

ROBERT R. THOMPSON.

REFERENCES CITED

The following references are of record in the file of this patent:

UNITED STATES PATENTS

| Number | Name | Date |
|---|---|---|
| 2,141,826 | Schlumberger | Dec. 27, 1938 |
| 2,317,259 | Doll | Apr. 20, 1943 |
| 2,415,364 | Mounce | Feb. 4, 1947 |

FOREIGN PATENTS

| Number | Country | Date |
|---|---|---|
| 692,993 | France | Aug. 11, 1930 |

OTHER REFERENCES

American Institute of Mining and Met. Engrs., "Geophysical Prospecting," article by Schlumberger et al., vol. 110 (1934), pages 122–134.